(12) United States Patent
Choi et al.

(10) Patent No.: US 9,791,601 B2
(45) Date of Patent: Oct. 17, 2017

(54) METHOD FOR FABRICATING AN EMBEDDED PATTERN USING A TRANSFER-BASED IMPRINTING

(71) Applicant: KOREA INSTITUTE OF MACHINERY & MATERIALS, Daejeon (KR)

(72) Inventors: Jun-Hyuk Choi, Daejeon (KR); Eung-Sug Lee, Changwon-si (KR); Ji-Hye Lee, Daejeon (KR); Jun-ho Jeong, Daejeon (KR); Joo-Yun Jung, Daejeon (KR); Dae-Guen Choi, Daejeon (KR); Cheol-Hyeon Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 395 days.

(21) Appl. No.: 14/194,084

(22) Filed: Feb. 28, 2014

(65) Prior Publication Data
US 2014/0311662 A1    Oct. 23, 2014

(30) Foreign Application Priority Data

Apr. 22, 2013  (KR) .......................... 10-2013-0044343

(51) Int. Cl.
*B32B 37/10*    (2006.01)
*B32B 37/12*    (2006.01)
(Continued)

(52) U.S. Cl.
CPC .............. *G02B 5/008* (2013.01); *B32B 37/06* (2013.01); *B82Y 20/00* (2013.01); *G09F 3/10* (2013.01);
(Continued)

(58) Field of Classification Search
CPC ... G02B 5/008; B82Y 20/00; Y10T 156/1031; Y10T 156/1041; B32B 27/06; G09F 3/10
(Continued)

(56) References Cited

U.S. PATENT DOCUMENTS 4,196,033 A * 4/1980 Arai ..................... D06N 3/0097
156/196
4,758,296 A * 7/1988 McGrew ............... B44C 1/1729
156/231
(Continued)

FOREIGN PATENT DOCUMENTS

JP    2012204584 A  * 10/2012
JP       5481963 B2  *  4/2014
KR     100665038 B1  *  1/2007

OTHER PUBLICATIONS

English translation of JP2012204584.*
(Continued)

*Primary Examiner* — Sonya Mazumdar
(74) *Attorney, Agent, or Firm* — Hauptman Ham, LLP (57) ABSTRACT

In a method for fabricating an embedded pattern using a transfer-based imprinting, an adhesive layer is formed on a substrate. The adhesive layer has a photo curable resin. A stamp having a protruded pattern is prepared. A thin-film layer is formed on an outer surface of the protruded pattern of the stamp. The stamp having the thin-film layer contact with the adhesive layer is pressed to selectively transfer the thin-film layer of the protruded pattern to the adhesive layer. Ultraviolet rays (UV) are irradiated to cure the adhesive layer. The stamp is removed.

12 Claims, 10 Drawing Sheets

(51) Int. Cl.
    *B29C 65/48*    (2006.01)
    *G02B 5/00*     (2006.01)
    *B32B 37/06*    (2006.01)
    *B44C 1/24*     (2006.01)
    *G09F 3/10*     (2006.01)
    *B82Y 20/00*    (2011.01)

(52) U.S. Cl.
    CPC .... *Y10T 156/1031* (2015.01); *Y10T 156/1041* (2015.01)

(58) Field of Classification Search
    USPC .......... 156/272.2, 275.5, 230, 247, 581, 220
    See application file for complete search history.

(56) References Cited

U.S. PATENT DOCUMENTS

| | | | | |
|---|---|---|---|---|
| 5,468,324 A | * | 11/1995 | Hong | B29C 37/0053 156/247 |
| 5,585,153 A | * | 12/1996 | Kamen | B41M 1/34 156/233 |
| 5,807,456 A | * | 9/1998 | Kaule | B41M 3/14 156/219 |
| 6,605,174 B1 | * | 8/2003 | Landa | B32B 27/08 156/233 |
| 2004/0045931 A1 | * | 3/2004 | Hill | B41M 1/18 216/54 |
| 2004/0250945 A1 | * | 12/2004 | Zheng | B82Y 10/00 156/230 |
| 2007/0160762 A1 | * | 7/2007 | Chaug | B44C 1/1729 427/256 |
| 2007/0289119 A1 | * | 12/2007 | Lee | B29C 39/025 29/592.1 |
| 2009/0029174 A1 | * | 1/2009 | Kirschner | B32B 17/10018 428/413 |
| 2010/0212821 A1 | * | 8/2010 | Grinberg | B41F 19/062 156/247 |
| 2013/0071636 A1 | * | 3/2013 | Lee | C09J 9/02 428/206 |

OTHER PUBLICATIONS

English translation of KR100665038B1.*
English Translation of JP2011009464.*
"Opinion according to the Notification of Reasons for Refusal" for KR2013-0044343; Jun. 13, 2014.*

* cited by examiner

METHOD FOR FABRICATING AN EMBEDDED PATTERN USING A TRANSFER-BASED IMPRINTING

PRIORITY STATEMENT

This application claims priority under 35 U.S.C. §119 to Korean Patent Application No. 10-2013-0044343, filed on Apr. 22, 2013 in the Korean Intellectual Property Office (KIPO), the contents of which application are herein incorporated by reference in their entirety.

BACKGROUND

1. Field of Disclosure

The present disclosure of invention relates to a method for fabricating an embedded pattern using a transfer-based imprinting. More particularly, the present disclosure of invention relates to a method for fabricating an embedded pattern using a transfer-based imprinting capable of fabricating the embedded pattern more easily.

2. Description of Related Technology

Localized surface plasmon resonance (LSPR) means that energy of incident light is combined with energy of free electrons on a metal surface having negative refractive index to be changed to a plasmon energy mode in a light-electron resonance condition. The LSPR is actively studied for increasing an inner efficiency of a solar cell or a light-emitting element.

Figure 1:
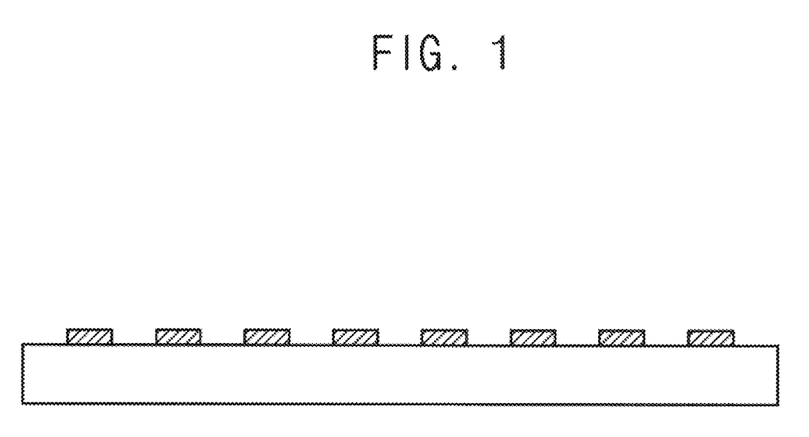
FIG. 1 is a cross-sectional view illustrating an example of a conventional protruded plasmonics pattern.

FIG. 1 is a cross-sectional view illustrating an example of a conventional protruded plasmonics pattern.

As illustrated in FIG. 1, a plasmonics nano-pattern basically means a metal nano-pattern array layer, and usually includes a protruded metal pattern protruded from a substrate.

When the protruded-shape metal pattern is used in a photoelectric element or a light-emitting element, an element layer is formed on the protruded-shape metal pattern. Thus, the element layer is formed with a curved concavo-convex shape due to the protruded-shape metal pattern, and thus a light-emitting efficiency is decreased. Conventionally, the element layer with the curved concavo-convex shape is additionally planarized to make the curved shape to be a plain shape.

SUMMARY

The present invention is developed to solve the above-mentioned problems of the related arts. The present invention provides a method for fabricating an embedded pattern using a transfer-based imprinting capable of forming a uniform shape embedded pattern.

According to an example embodiment, a method for fabricating an embedded pattern using a transfer-based imprinting, an adhesive layer is formed on a substrate. The adhesive layer has a photo curable resin. A stamp having a protruded pattern is prepared. A thin-film layer is formed on an outer surface of the protruded pattern of the stamp. The stamp having the thin-film layer contact with the adhesive layer is pressed to selectively transfer the thin-film layer of the protruded pattern to the adhesive layer. Ultraviolet rays (UV) are irradiated to cure the adhesive layer. The stamp is removed.

In an example embodiment, the selectively transferring the thin-film layer may include making the thin-film layer of the protruded pattern contact with the adhesive layer, pressing the stamp such that the adhesive layer is caved, and controlling a temperature to increase an adhesive force between the adhesive layer and the thin-film layer.

In an example embodiment, the adhesive layer that is not caved in the selectively transferring the thin-film layer may be planarized.

In an example embodiment, the preparing the stamp may include forming an anti-adhesive layer on an outer surface of the stamp, and coating the thin-film layer on the outer surface of the stamp with the anti-adhesive layer.

In an example embodiment, the UV or plasma may be irradiated to the adhesive layer for pre-curing the adhesive layer, before curing the adhesive layer.

According to the present invention, an embedded pattern fabricated by using a transfer-based imprinting in which an imprinting stamp is pressed on a substrate.

In addition, an adhesive layer is pre-cured before transferring the thin-film layer, and thus the hardness of the adhesive layer is increased and the stamp pressed to the substrate may be controlled more easily.

In addition, anti-adhesive layer is formed on the stamp and the thin-film layer is coated on the anti-adhesive layer, and thus the thin-film layer is detached more easily.

BRIEF DESCRIPTION OF THE DRAWINGS

The above and other features and advantages will become more apparent by describing exemplary embodiments thereof with reference to the accompanying drawings, in which.

DETAILED DESCRIPTION

Hereinafter, exemplary embodiment of the invention will be explained in detail with reference to the accompanying drawings.

Figure 2:
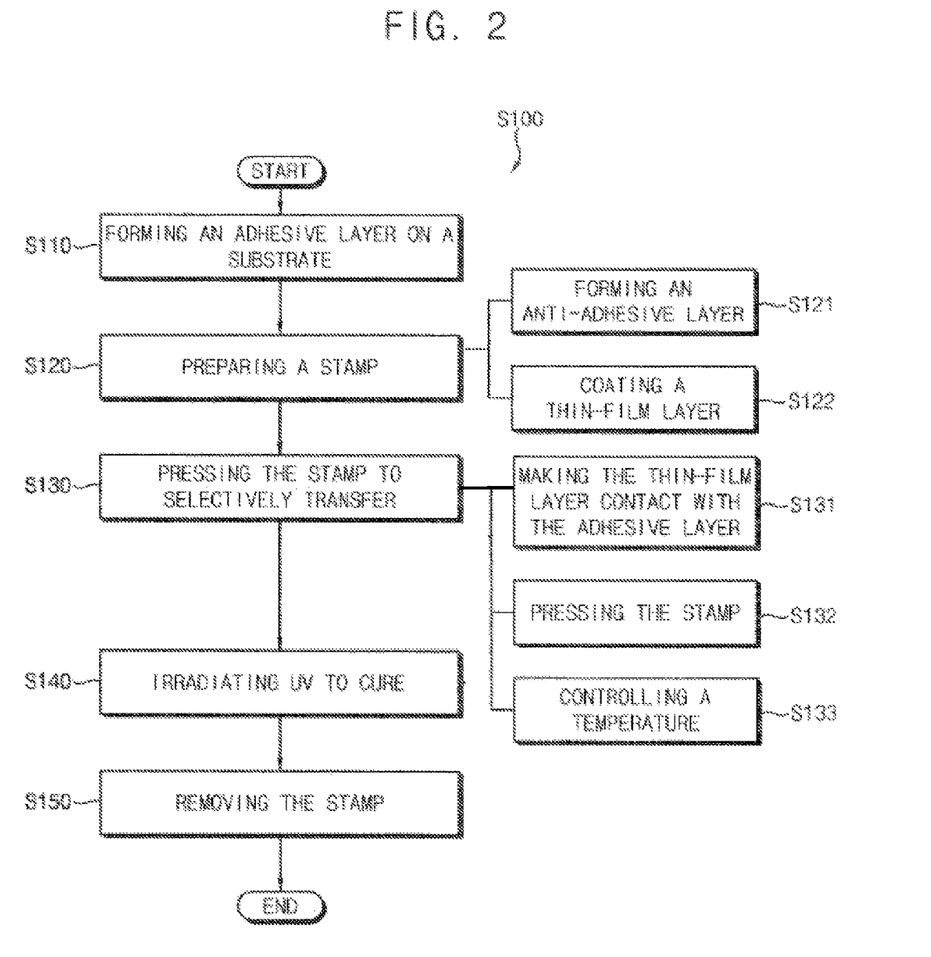
FIG. 2 is a flow chart illustrating a method for fabricating an embedded pattern using a transfer-based imprinting according to an example embodiment of the present invention.

FIG. 2 is a flow chart illustrating a method for fabricating an embedded pattern using a transfer-based imprinting according to an example embodiment of the present invention.

Figure 3A:
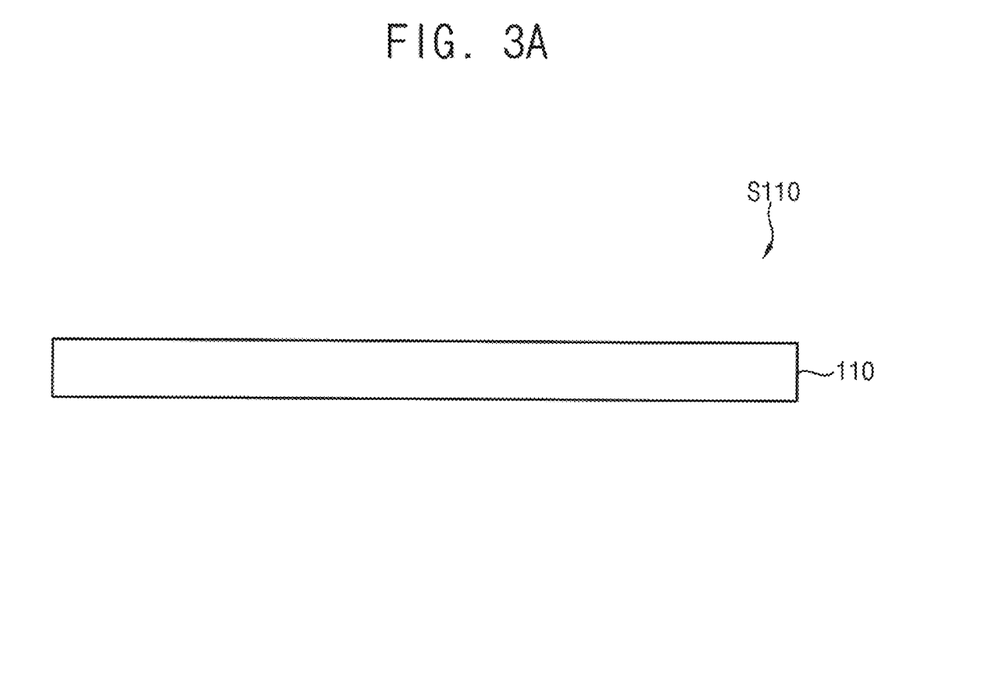
FIGS. 3A and 3B are cross-sectional views illustrating forming an adhesive layer on a substrate of FIG. 2.
Figure 3B:
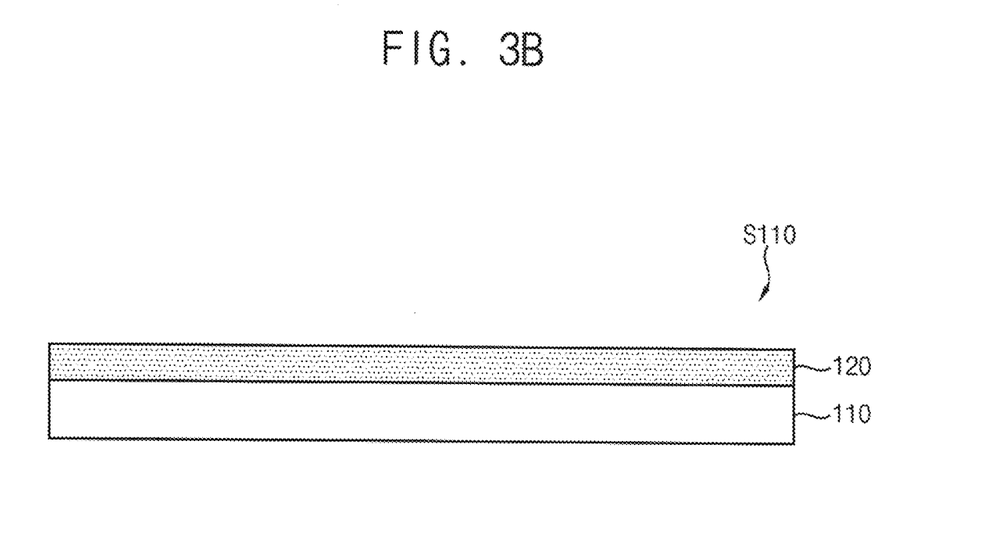
Figure 4A:
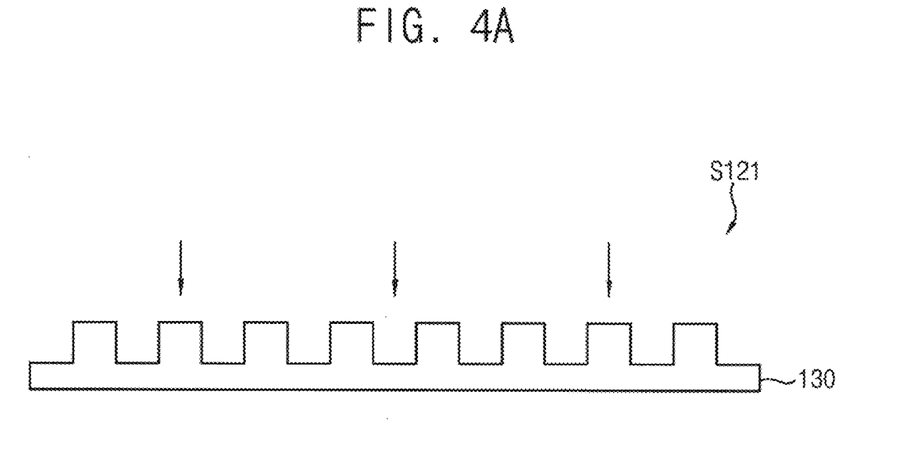
FIGS. 4A and 4B are cross-sectional views illustrating preparing a stamp of FIG. 2.
Figure 4B:
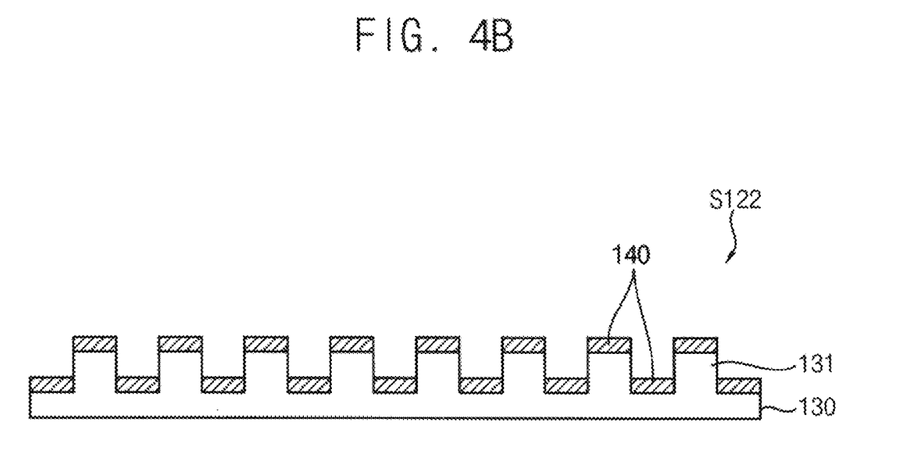
Figure 5A:
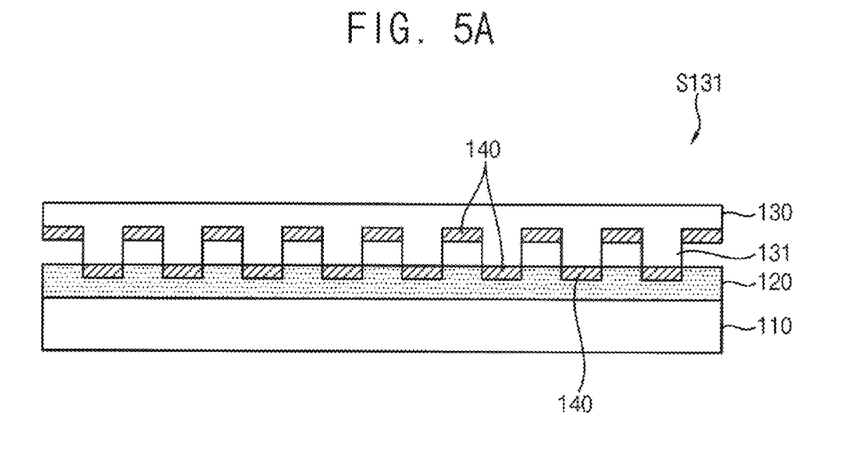
FIGS. 5A, 5B and 5C are cross-sectional views illustrating pressing the stamp to selective transfer of FIG. 2.
Figure 5B:
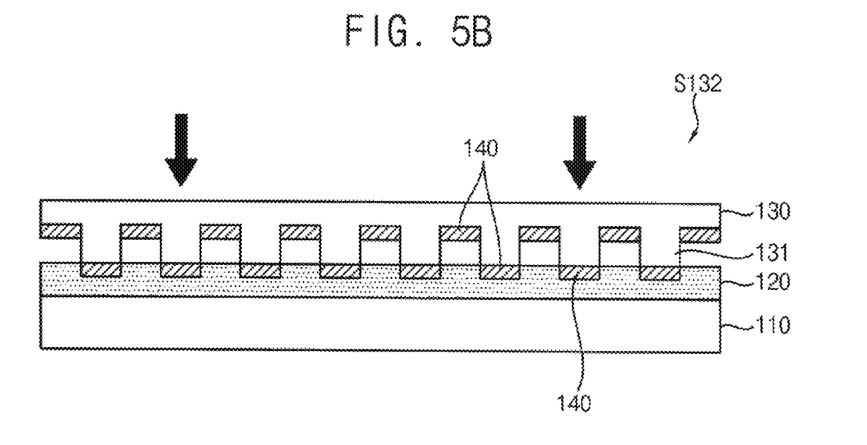
Figure 5C:
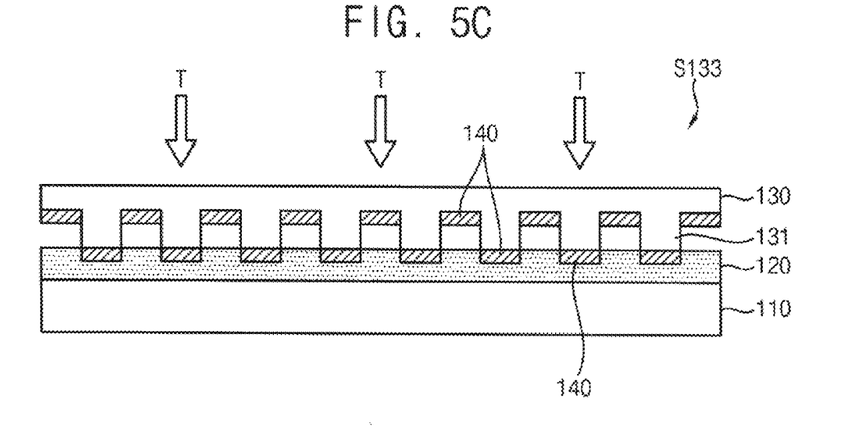
Figure 6:
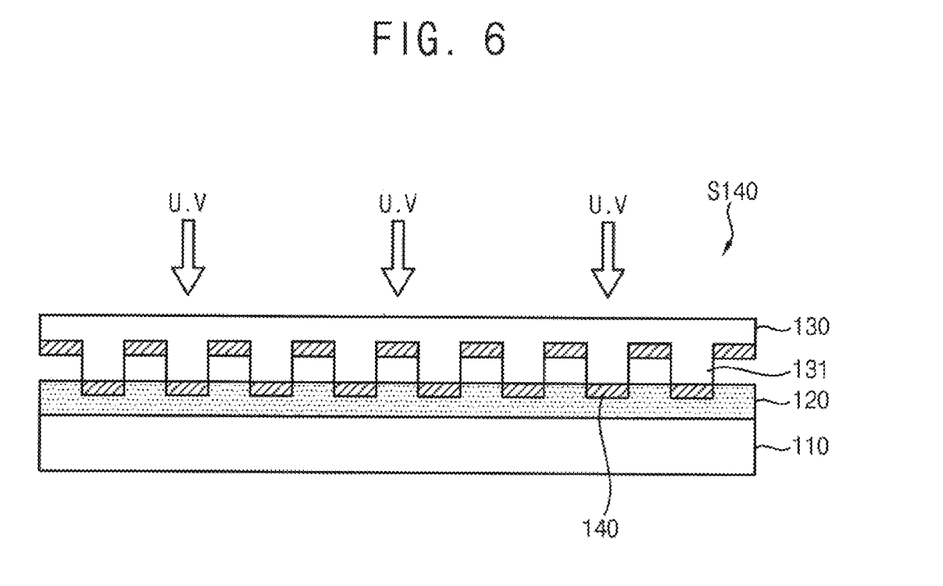
FIG. 6 is a cross-sectional view illustrating irradiating UV to cure of FIG. 2.
Figure 7:
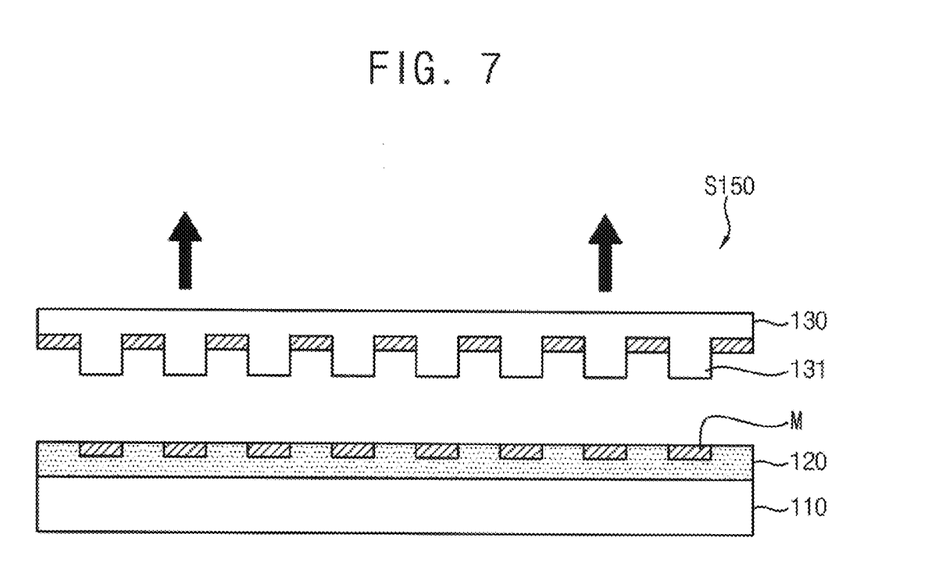
FIG. 7 is a cross-sectional view illustrating removing the stamp of FIG. 2.

FIGS. 3A and 3B are cross-sectional views illustrating forming an adhesive layer on a substrate of FIG. 2. FIGS. 4A and 4B are cross-sectional views illustrating preparing a stamp of FIG. 2. FIGS. 5A, 5B and 5C are cross-sectional views illustrating pressing the stamp to selective transfer of FIG. 2. FIG. 6 is a cross-sectional view illustrating irradiating UV to cure of FIG. 2. FIG. 7 is a cross-sectional view illustrating removing the stamp of FIG. 2.

Referring to FIG. 2, the method for fabricating an embedded pattern using a transfer-based imprinting according to the present example embodiment (S100) includes forming an adhesive layer on a substrate (S110), preparing a stamp (S120), pressing the stamp to selectively transfer (S130), irradiating UV to cure (S140) and removing the stamp (S150).

Referring to FIGS. 2, 3A and 3B, an adhesive layer 120 is formed on a substrate 120. The adhesive layer 120 is a target layer on which a thin-film layer 140 is transferred in the pressing the stamp to selective transfer (S310).

The substrate 120 may be a soft-type substrate including silicone, glass, polymer and so on, such that the substrate 120 may absorb a pressure in the pressing the stamp to selectively transfer (S130). Alternatively, the substrate 120 may be a hard-type substrate including relatively hard material, considering the pressure in the pressing the stamp to selectively transfer (S130).

The adhesive layer 120 may be a photo curable resin, and the adhesive layer 120 may be coated on the substrate 110 via a spin coating. Alternatively, the adhesive layer 120 may be coated on the substrate 110 via an alternatively coating method.

Referring to FIGS. 2, 4A and 4B, in preparing a stamp (S120), a thin-film 140 is formed on a stamp 130 from which a plurality of protruded patterns 131 is protruded, to prepare the stamp 130. The preparing the stamp (S120) includes forming an anti-adhesive layer (S121) and coating the thin-film layer (S122).

As illustrated in FIG. 4A, the forming the anti-adhesive layer (S121) is a pre-process for the coating the thin-film layer (S122). In the forming the anti-adhesive layer (S121), a fluoric-based chemical is coated on the stamp 130 via vapor deposition in a chamber with a vacuum state or an atmospheric pressure, with a temperature between about 30° C. and about 90° C., for about 5~20 min. Then, the stamp 130 is purged with a nitrogen gas and aged for a predetermined period, and thus an anti-adhesive layer is strongly attached on an outer surface of the stamp 130.

Here, the anti-adhesive layer may be attached on the outer surface of the stamp 130 as a thin-film type layer. Alternatively, the anti-adhesive layer may be not a layer or film but the outer surface of the stamp 130 may be merely treated to be anti-adhesive without an independent layer. However, hereinafter, the anti-adhesive layer attached on the outer surface of the stamp 130 means the above-mentioned both types for convenience of the explanation.

Accordingly, in the forming the anti-adhesive layer (S121), the anti-adhesive layer is attached on the outer surface of the stamp 130, and thus the thin-film layer 140 formed on the stamp 130 is detached from the stamp 130 more easily.

As illustrate in FIG. 4B, in the coating the thin-film layer (S122), the thin-film layer 140 is coated on the stamp 130 on which the anti-adhesive layer is attached.

In the coating the thin-film layer (S122), the thin-film layer 140 is coated on an upper surface of the protruded patterns 131 and on gaps between the protruded patterns 131 adjacent to each other. In the present example embodiment, the thin-film layer 140 is coated on an overall surface of the stamp 130.

Alternatively, the thin-film layer 140 is merely coated on the upper surface of the protruded patterns 131. For example, the thin-film layer 140 may be selectively coated on the upper surface of the protruded patterns 131 making contact with the adhesive layer 120 in the pressing the stamp to selectively transfer (S130).

In addition, the thin-film layer 140 is coated on the outer surface of the stamp 130, such as sputtering, and may include a metal material like silver (Ag), gold (Au), aluminum (Al) and so on.

Referring to FIGS. 2, 5A, 5B and 5C, in the pressing the stamp to selectively transfer (S130), the stamp 130 is pressed with making contact with the adhesive layer 120, and thus the thin-film layer 140 coated on the stamp 130 is transferred to the adhesive layer 120 formed on the substrate 110. The pressing the stamp to selectively transfer (S130) includes the making the thin-film layer contact with the adhesive layer (S131), the pressing the stamp (S132) and the controlling a temperature (S133).

As illustrated in FIG. 5A, in the making the thin-film layer contact with the adhesive layer (S131), the thin-film layer 140 makes contact with the adhesive layer 120. For example, the thin-film layer 140 coated on the protruded patterns 131 of the stamp 130 is disposed to face the adhesive layer 120, and then the stamp 130 moves such that the thin-film layer 140 makes contact with the adhesive layer 120.

As illustrated in FIG. 5B, in the pressing the stamp (S132), the stamp 130 is pressed toward the substrate 110 with the thin-film layer 140 and the adhesive layer 120 making contact with each other, and thus the adhesive layer 120 is inwardly caved. For example, the stamp 130 is pressed such that portions of the adhesive layer 120 facing the protruded patterns 131 are selectively caved or embedded.

Thus, the adhesive layer 140 coated on the stamp 130 is received in the caved or embedded adhesive layer 120. Here, a pressure of the stamp 130 is controlled such that depth of the caved or embedded adhesive layer 120 is substantially same as thickness of the thin-film layer 140.

As illustrated in FIG. 5C, in the controlling the temperature (S133), the temperature is controlled such that the thin-film layer 140 coated on the stamp 130 is transferred to the adhesive layer 120.

For example, the temperature is controlled such that the thin-film layer 140 having the metal material and making contact with the caved or embedded adhesive layer 120 is entirely transferred to the adhesive layer 120. The temperature may be controlled by considering all kinds of conditions such as the metal material of the thin-film layer 140, the material of the adhesive layer 120, the thickness of the thin-film layer 140 coated on the stamp 130 and so on.

Thus, in the pressing the stamp to selectively transfer (S130), the thin-film layer 140 is transferred and is received in the caved or embedded adhesive layer 120. In addition, the pressure is controlled in the pressing the stamp (S132) such that an upper surface of the adhesive layer 120 not pressed by the stamp 130 is in a horizontal plain with an upper surface of the thin-film layer 140 transferred to the caved or embedded adhesive layer 120.

Referring to FIGS. 2 and 6, in the irradiating UV to cure (S140), the adhesive layer 120 having a photo curable resin and formed on the substrate 110 is cured. Here, ultraviolet rays (UV) is irradiated to the adhesive layer 120 to finally cure the adhesive layer 120, and the thin-film 140 is caved or embedded to the adhesive layer 120. Thus, an embedded pattern M is finally fabricated.

Referring to FIGS. 2 and 7, in the removing the stamp (S150), the stamp 130 is removed from the cured adhesive layer 120.

In the present example embodiment, a plasmonics pattern is characterized by height, width, etc. of the embedded pattern M, and thus height and width of the thin-film layer 140, depth of the adhesive layer 120 and so on should be determined in the preparing the stamp (S120) and the pressing the stamp to selectively transfer (S130) to fabricate the embedded pattern M with an optimized size when the embedded pattern M is used as a plasmonics pattern.

Figure 8A:
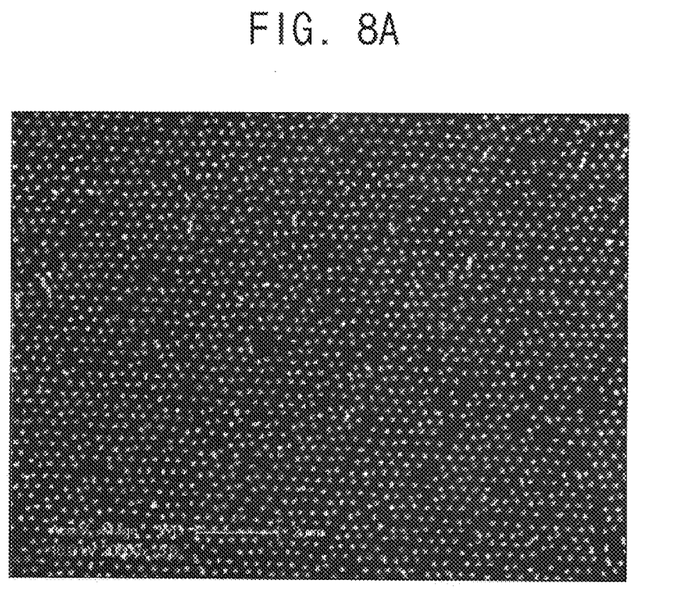
FIGS. 8A and 8B are images of a metal pattern formed by the method of FIG. 2.
Figure 8B:
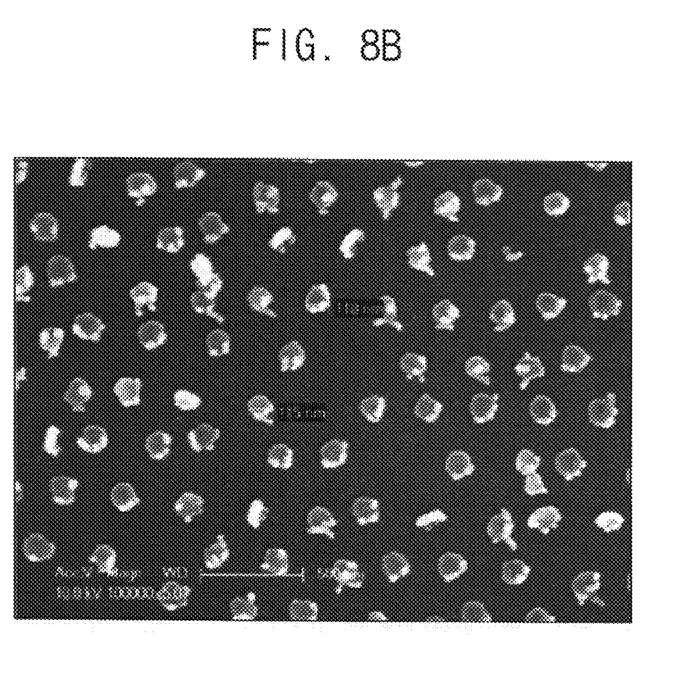

FIGS. 8A and 8B are images of a metal pattern formed by the method of FIG. 2.

Referring to FIGS. 8A and 8B, the embedded pattern having the metal material as illustrated in FIGS. 8A and 8B may be fabricated via the method (S100) as mentioned above.

Figure 9:
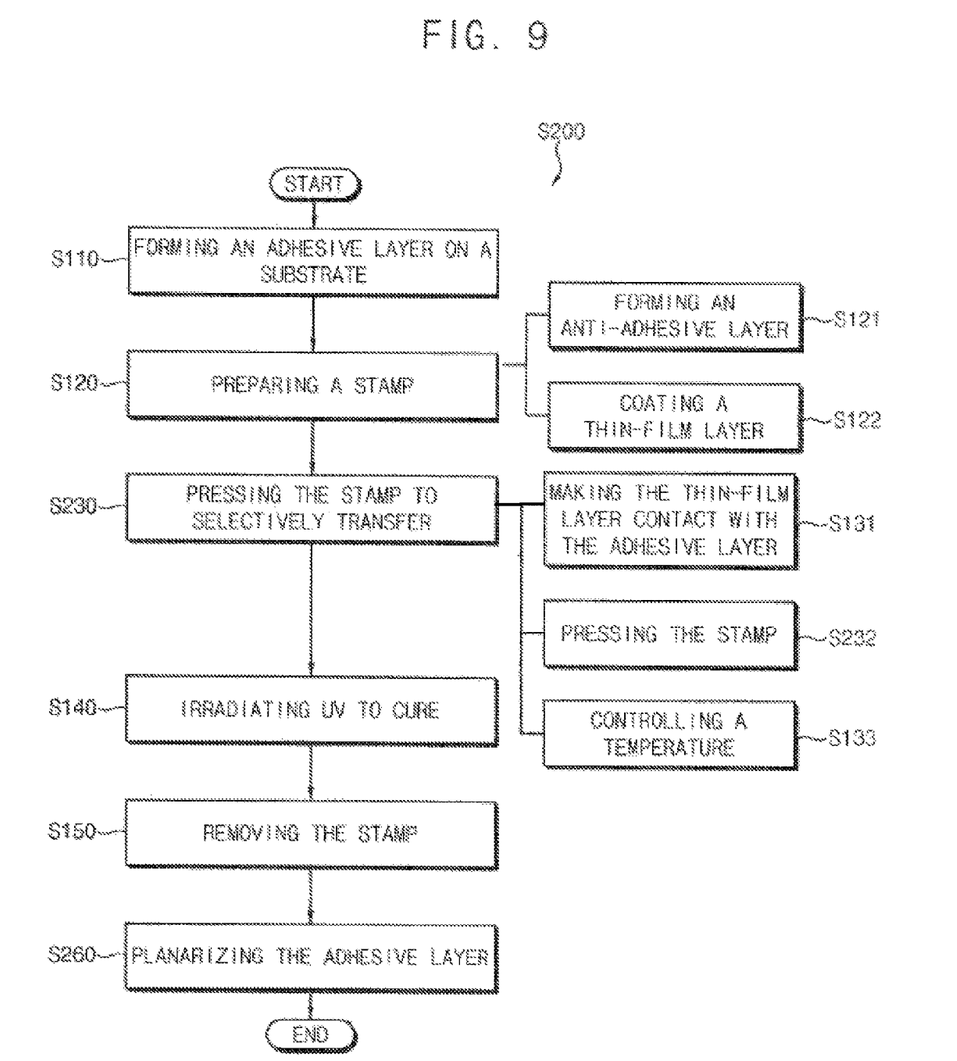
FIG. 9 is a flow chart illustrating a method for fabricating an embedded pattern using a transfer-based imprinting according to another example embodiment of the present invention.
Figure 10A:
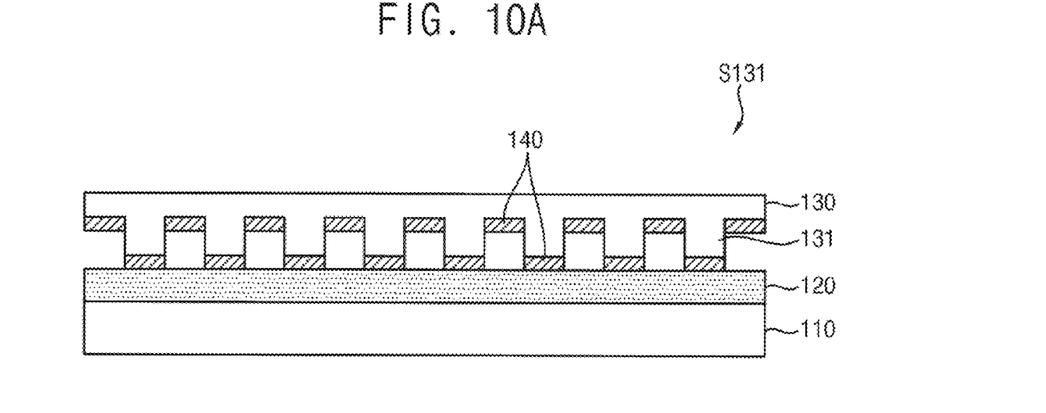
FIGS. 10A, 10B and 10C are cross-sectional views illustrating pressing a stamp to selectively transfer of FIG. 9.
Figure 10B:
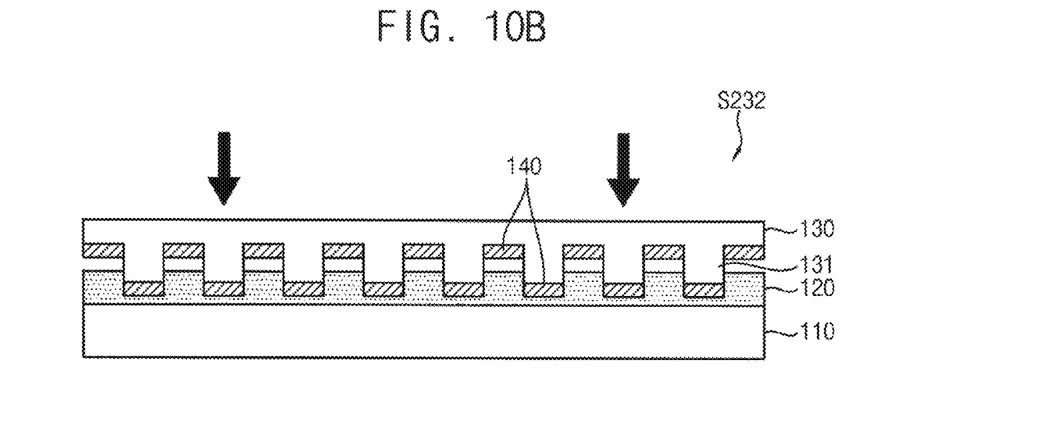
Figure 10C:
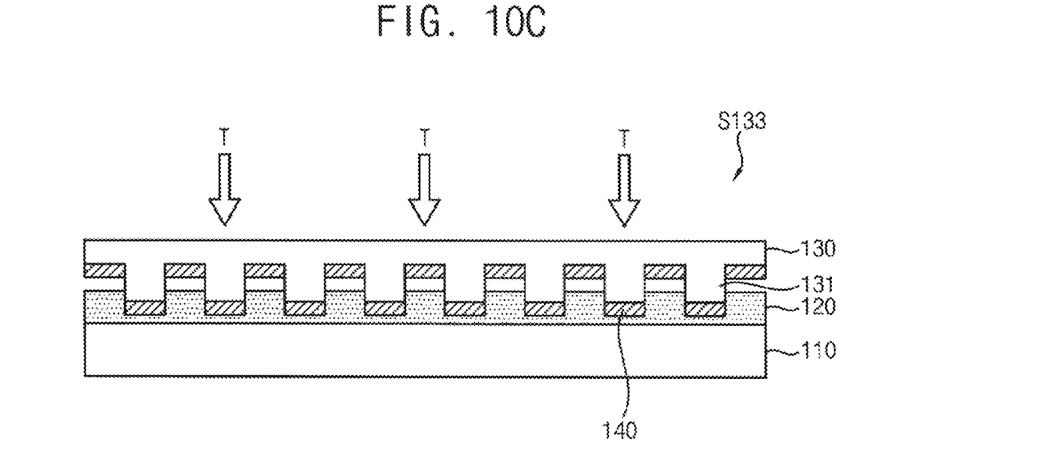

FIG. 9 is a flow chart illustrating a method for fabricating an embedded pattern using a transfer-based imprinting according to another example embodiment of the present invention. FIGS. 10A, 10B and 10C are cross-sectional views illustrating pressing a stamp to selectively transfer of FIG. 9.

The method (S200) according to the present example embodiment is substantially same as the method (S100) according to the previous example embodiment except for the pressing the stamp and planarizing the adhesive layer, and thus same reference numerals are used and any repetitive explanation will be omitted.

Referring to FIGS. 9, 10A, 10B and 10C, the method (S200) according to the present example embodiment includes the forming the adhesive layer on the substrate (S110), the preparing the stamp (S120), the pressing the stamp to selectively transfer (S230), the irradiating UV to cure (S140), the removing the stamp (S150) and planarizing the adhesive layer (S260).

In the present example embodiment, the pressing the stamp to selectively transfer (S230) includes the making the thin-film layer contact with the adhesive layer (S131), pressing the stamp (S232), and the controlling the temperature (S133).

The forming the adhesive layer on the substrate (S110), the preparing the stamp (S120), the irradiating UV to cure (S140) and the removing the stamp (S150) of the method according to the present example embodiment is substantially same as those of the method according to the previous example embodiment, and thus repetitive explanation is omitted.

In addition, the making the thin-film layer contact with the adhesive layer (S131) of the method according to the present example embodiment as illustrated in FIG. 10A is substantially same as the making the thin-film layer contact with the adhesive layer (S131) of the method according to the previous example embodiment, and thus repetitive explanation is omitted.

Further, the controlling the temperature (S133) of the method according to the present example embodiment as illustrated in FIG. 10C is substantially same as the controlling the temperature (S133) of the method according to the previous example embodiment, and thus repetitive explanation is omitted.

As illustrated in FIG. 9B, in the pressing the stamp (S232), the stamp 130 is pressed toward the substrate 110 with the thin-film layer 140 and the adhesive layer 120 making contact with each other, and thus the adhesive layer 120 is inwardly caved. For example, the stamp 130 is pressed such that portions of the adhesive layer 120 facing the protruded patterns 131 are selectively caved or embedded.

Thus, in the present example embodiment, the stamp 130 is pressed without controlling a power of the pressure, and thus the adhesive layer 120 is caved or embedded by a depth more than the thickness of the thin-film layer 140 received in the adhesive layer 120.

Referring to FIG. 9 again, the stamp 130 is removed (S150), and then the adhesive layer 120 that is not caved or embedded in the selectively transferring the thin-film layer 140 is planarized (S260). For example, the adhesive layer 120 exposed to outside is removed to be planarized. Thus, the embedded pattern M is fabricated.

Accordingly, in the present example embodiment, the embedded pattern M is fabricated via planarizing the adhesive layer 120 (S260) without controlling the power of the pressure in the pressing the stamp to selectively transfer (S230). Thus, the process according to the present example embodiment is more simplified.

Figure 11:
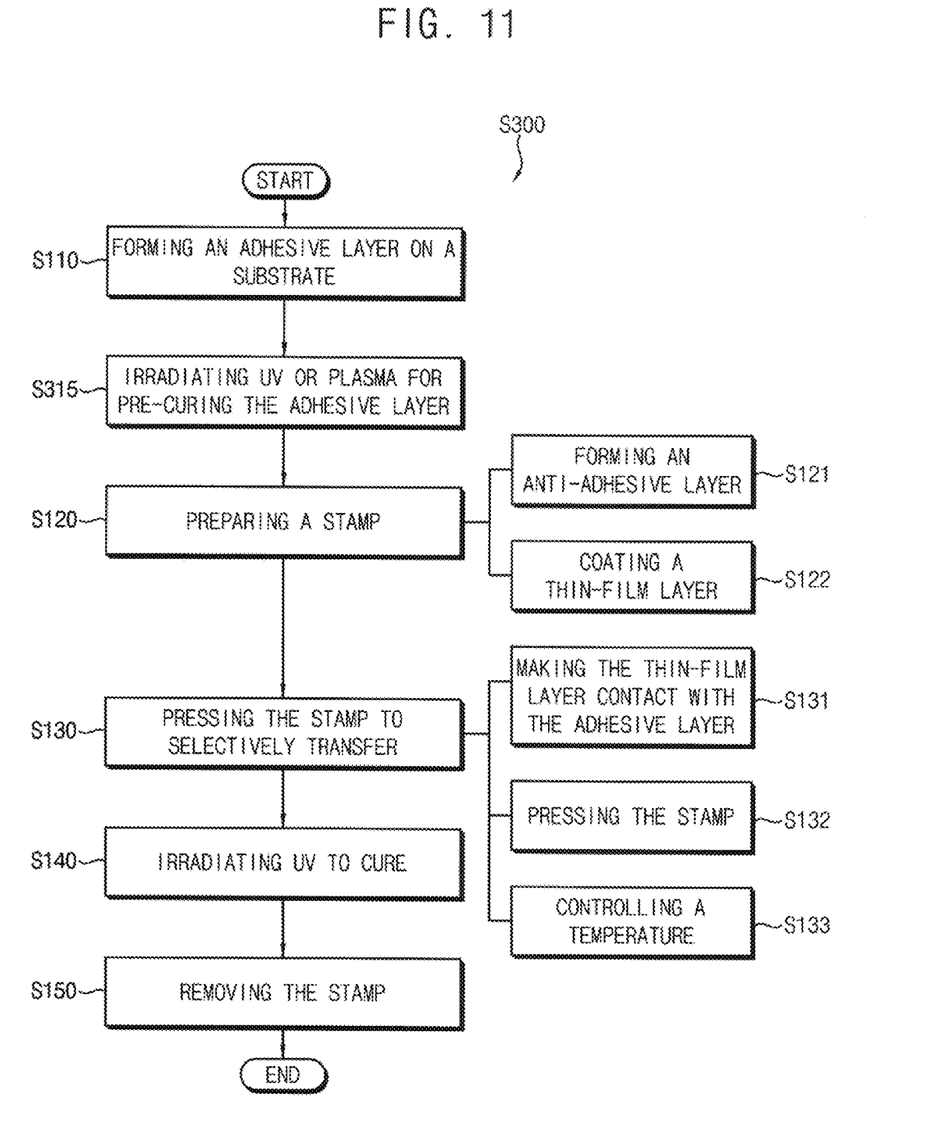
FIG. 11 is a flow chart illustrating a method for fabricating an embedded pattern using a transfer-based imprinting according to still another example embodiment of the present invention.

FIG. 11 is a flow chart illustrating a method for fabricating an embedded pattern using a transfer-based imprinting according to still another example embodiment of the present invention.

The method (S300) according to the present example embodiment is substantially same as the method (S100) according to the previous example embodiment except for irradiating UV or plasma for pre-curing the adhesive layer, and thus same reference numerals are used and any repetitive explanation will be omitted.

Referring to FIG. 11, the method (S300) according to the present example embodiment includes the forming the adhesive layer on the substrate (S110), the irradiating UV or plasma for pre-curing the adhesive layer (S315), the preparing the stamp (S120), the pressing the stamp to selectively transfer (S130), the irradiating UV to cure (S140) and the removing the stamp (S150).

In the irradiating UV or plasma for pre-curing the adhesive layer (S315), the adhesive layer 120 having the photo curable resin and formed on the substrate 110 is pre-cured before the thin-film layer 140 is transferred to the adhesive layer 120.

For example, the adhesive layer 120 is pre-cured such that the hardness of the adhesive layer 120 may be increased in the irradiating UV or plasma for pre-curing the adhesive layer (S315). Thus, the adhesive layer 120 pressed by the stamp 130 in the pressing the stamp to selectively transfer (S130) is prevented from being caved or embedded more excessively, and the power of the pressure of the stamp 130 is more easily controlled.

In addition, the adhesive layer 120 may be pre-cured such that the adhesive layer 120 be plastically deformed due to the pressure of the stamp 130 in the pressing the stamp to selectively transfer (S130).

In the irradiating UV or plasma for pre-curing the adhesive layer (S315), ultraviolet rays (UV) or plasma is irradiated to the adhesive layer 120. Alternatively, the adhesive layer 120 may be pre-cured via various kinds of methods.

Accordingly, the additional pre-curing process is performed before curing the adhesive layer 120 to increase the hardness of the adhesive layer 120, and thus the power of the pressure of the stamp may be controlled more easily in the pressing the stamp to selective transfer (S130).

According to the present invention, an embedded pattern fabricated by using a transfer-based imprinting in which an imprinting stamp is pressed on a substrate.

In addition, an adhesive layer is pre-cured before transferring the thin-film layer, and thus the hardness of the adhesive layer is increased and the stamp pressed to the substrate may be controlled more easily.

In addition, anti-adhesive layer is formed on the stamp and the thin-film layer is coated on the anti-adhesive layer, and thus the thin-film layer is detached more easily.

The foregoing is illustrative of the present teachings and is not to be construed as limiting thereof. Although a few exemplary embodiments have been described, those skilled in the art will readily appreciate from the foregoing that many modifications are possible in the exemplary embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A method for fabricating an embedded pattern using a transfer-based imprinting, the method comprising:
    forming an adhesive layer on a substrate, the adhesive layer having a photo curable resin;
    preparing a stamp having a protruded pattern, the protruded pattern having a uniform height, a thin-film layer being formed on an outer surface of the protruded pattern of the stamp, the thin-film layer having a metal material;
    selectively transferring the thin-film layer of the protruded pattern to the adhesive layer;
    irradiating ultraviolet rays (UV) to cure the adhesive layer; and
    removing the stamp,
    wherein the selectively transferring the thin-film layer comprises:
        making the thin-film layer of the protruded pattern contact with the adhesive layer;
        pressing the stamp such that the adhesive layer is caved; and
        controlling a temperature to increase an adhesive force between the adhesive layer and the thin-film layer, and
    wherein a depth of the caved adhesive layer is substantially same as or greater than a thickness of the thin-film layer, and the adhesive layer is planarized when the depth of the caved adhesive layer is greater than the thickness of the thin-film layer, and thus an upper surface of the adhesive layer is coplanar with an upper surface of the thin-film layer.

2. The method of claim 1, wherein the preparing the stamp comprises:
    forming an anti-adhesive layer on an outer surface of the stamp; and
    coating the thin-film layer on the outer surface of the stamp with the anti-adhesive layer.

3. The method of claim 1, further comprising:
    irradiating the UV or plasma to the adhesive layer for pre-curing the adhesive layer, before curing the adhesive layer.

4. The method of claim 1, further comprising:
    controlling a pressure of the pressing such that, when said pressing is completed, an upper surface of the adhesive layer not pressed by the stamp is flush with the upper surface of the thin-film layer transferred to the caved adhesive layer.

5. A method for fabricating an embedded pattern using a transfer-based imprinting, the method comprising:
    forming an adhesive layer on a substrate, the adhesive layer having a photo curable resin;
    preparing a stamp having a plurality of protrusions of a uniform height, a thin-film layer being formed on the plurality of protrusions of the stamp, the thin-film layer having a metal material;
    selectively transferring the thin-film layer on the plurality of protrusions to the adhesive layer;
    irradiating ultraviolet rays (UV) to cure the adhesive layer; and
    removing the stamp,
    wherein the selectively transferring the thin-film layer comprises:
        making the thin-film layer on the plurality of protrusions contact with the adhesive layer;
        pressing the stamp such that portions of the adhesive layer in contact with the plurality of protrusions are depressed and the thin-film layer on the plurality of protrusions are embedded in the depressed portions of the adhesive layer; and
        controlling a temperature to increase an adhesive force between the adhesive layer and the thin-film layer,
    wherein the pressing is performed such that a depth of the depressed portions of the adhesive layer is substantially same as or greater than a thickness of the thin-film layer embedded in the depressed portions of the adhesive layer, and
    wherein, when the depth of the depressed portions of the adhesive layer obtained by said pressing is greater than the thickness of the thin-film layer embedded in the depressed portions of the adhesive layer, the method further comprises, after the selectively transferring,
        planarizing the adhesive layer such that an upper surface of the adhesive layer in portions other than the depressed portions becomes coplanar with an upper surface of the thin-film layer transferred to and embedded in the depressed portions of the adhesive layer.

6. The method of claim 5, wherein the preparing the stamp comprises:
    forming an anti-adhesive layer on an outer surface of the stamp; and
    coating the thin-film layer on the outer surface of the stamp with the anti-adhesive layer.

7. The method of claim 5, further comprising, before the selectively transferring the thin-film layer,
    irradiating the UV or plasma to the adhesive layer for pre-curing the adhesive layer.

8. The method of claim 5, further comprising:
    controlling a pressure of the pressing such that, when said pressing is completed, an upper surface of the adhesive layer in portions not in contact with the plurality of protrusions is flush with the upper surface of the thin-film layer transferred to and embedded in the depressed portions of the adhesive layer.

9. The method of claim 5, wherein
    the preparing the stamp comprises:
        forming, in the stamp, a plurality of recesses each between a pair of adjacent protrusions among the plurality of protrusions, and forming the thin-film layer on top surfaces of the plurality of protrusions and on bottom surfaces of the plurality of recesses, and the pressing is performed such that
  the thin-film layer on the top surfaces of the plurality of protrusions are embedded in the depressed portions of the adhesive layer, and
  the thin-film layer on the bottom surfaces of the plurality of recesses are free of direct contact with the adhesive layer.

10. The method of claim 9, wherein
during the controlling the temperature,
  the thin-film layer on the top surfaces of the plurality of protrusions remain embedded in the depressed portions of the adhesive layer, and
  the thin-film layer on the bottom surfaces of the plurality of recesses remain free of direct contact with the adhesive layer.

11. The method of claim 10, wherein
during the irradiating UV to cure the adhesive layer,
  the thin-film layer on the top surfaces of the plurality of protrusions remain embedded in the depressed portions of the adhesive layer, and
  the thin-film layer on the bottom surfaces of the plurality of recesses remain free of direct contact with the adhesive layer.

12. The method of claim 11, wherein
upon the removing the stamp, the thin-film layer on the bottom surfaces of the plurality of recesses remain on the stamp removed from the cured adhesive layer.

\* \* \* \* \*